United States Patent [19]

D'Amato et al.

[11] 4,187,443

[45] Feb. 5, 1980

[54] COLOR PICTURE TUBE HAVING IMPROVED CORRUGATED APERTURED MASK AND METHOD OF MAKING SAME

[75] Inventors: Ralph J. D'Amato; Richard A. Nolan, both of Lancaster, Pa.

[73] Assignee: RCA Corporation, New York, N.Y.

[21] Appl. No.: 940,570

[22] Filed: Sep. 8, 1978

[51] Int. Cl.[2] .......................... B23P 15/16; H01J 9/14; H01J 29/07

[52] U.S. Cl. .................................... 313/402; 29/25.18; 29/163.5 R; 313/407

[58] Field of Search ........................ 313/402, 403, 407; 29/25.18, 163.5 R

[56] References Cited

U.S. PATENT DOCUMENTS

| | | | |
|---|---|---|---|
| 3,600,213 | 8/1971 | Arndt | 313/402 X |
| 3,909,928 | 10/1975 | Sato et al. | 313/402 X |
| 4,072,876 | 2/1978 | Morrell | 313/403 |
| 4,122,368 | 10/1978 | Masterton | 313/403 |

FOREIGN PATENT DOCUMENTS

| | | | |
|---|---|---|---|
| 458183 | 3/1928 | Fed. Rep. of Germany | 29/163.5 R |
| 49-141754 | 12/1974 | Japan | 313/403 |
| 52-57776 | 5/1977 | Japan | 313/407 |

*Primary Examiner*—Palmer C. Demeo
*Attorney, Agent, or Firm*—Eugene M. Whitacre; Glenn H. Bruestle; Dennis H. Irlbeck

[57] ABSTRACT

The present invention provides an improvement in an apertured mask type color picture tube having a faceplate, a cathodoluminescent screen on the faceplate, a corrugated apertured mask adjacent the screen and an electron gun means for producing and directing a plurality of electron beams through the mask to impinge upon the screen. The mask is constructed by first forming the apertures therein and thereafter forming the mask in a corrugated shape. Aperture width in the apertured but unformed mask is adjusted to compensate for stretching and compression of the mask occurring during formation of the mask into a corrugated shape. Therefore, the corrugated mask is substantially free of aperture width variation from that desired caused by forming the mask in a corrugated shape.

6 Claims, 6 Drawing Figures

COLOR PICTURE TUBE HAVING IMPROVED CORRUGATED APERTURED MASK AND METHOD OF MAKING SAME

BACKGROUND OF THE INVENTION

This invention relates to shadow mask type color picture tubes, and particularly to variations in the aperture patterns of shadow masks within such tubes having corrugated apertured masks.

In a recently suggested shadow mask type color picture tube disclosed in U.S. Pat. No. 4,072,876, issued to A. M. Morrell on Feb. 7, 1978, a mask corrugated in the horizontal direction is incorporated in combination with a flat or substantially flat faceplate. The apertures of the corrugated mask are slit-shaped and are aligned in vertical columns. In order to keep an acceptable pattern formation of the phosphor lines comprising the screen, the horizontal spacing between aperture columns and/or aperture width are varied as functions of the spacing variation between the mask and the screen. The present invention recognizes this prior art variation in aperture width and aperture column-to-aperture column spacing and provides another variation in aperture width in an apertured but unformed mask to compensate for deformation of the apertures that occur during formation of the mask into a corrugate shape.

SUMMARY OF THE INVENTION

The present invention provides an improvement in a corrugated apertured mask type color picture tube. Aperture width in the apertured but unformed mask is adjusted to compensate for stretching and compression of the mask occurring during formation of the mask into a corrugated shape. Therefore, the corrugated mask is substantially free of aperture width variation caused by forming the mask in a corrugated shape.

DESCRIPTION OF THE PREFERRED EMBODIMENTS

Figure 1:
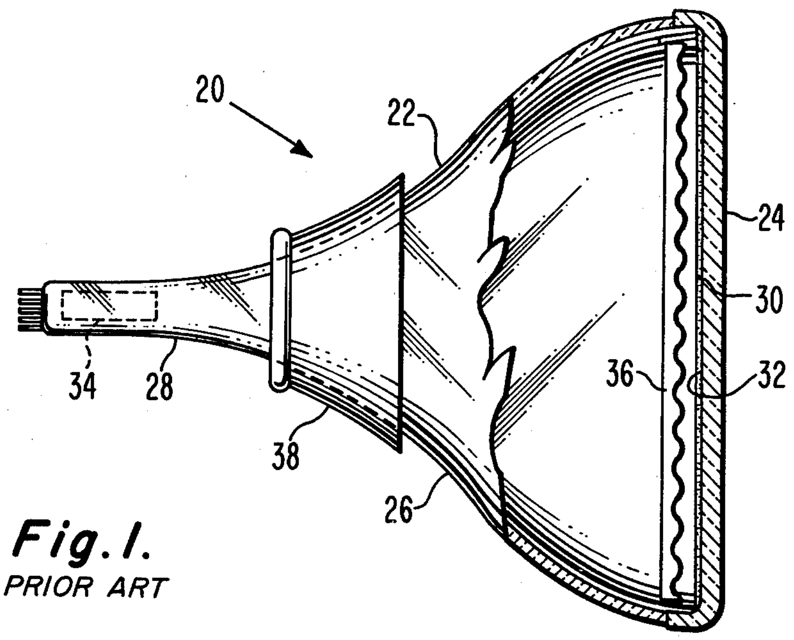
Fig. 1. PRIOR ART
FIG. 1 is a partially cut-away top view of a color picture tube having a flat faceplate and a corrugated mask.

FIG. 1 illustrates an apertured-mask color television picture tube 20 comprising an evacuated glass envelope 22 including a substantially rectangularly-shaped flat faceplate panel 24, a funnel 26, and a neck 28. A three-color phosphor-viewing screen 30 is supported on the inner surface 32 of the faceplate panel 24. An electron gun assembly 34, positioned in the neck 28, includes three electron guns (not shown), one for each of the three color phosphors on the viewing screen 30. A rectangular corrugated apertured mask 36 is positioned in the envelope 22 adjacent the viewing screen 30. The electron gun assembly 34 is adapted to project three electron beams through the apertured mask 36 to strike the viewing screen structure 30 with the mask 36 serving as a color selection electrode. A magnetic deflection yoke 38 is positioned on the envelope 22 near the intersection of the funnel 26 and the neck 28. When suitably energized, the yoke 38 causes the electron beams to scan the screen 30 in a rectangular raster.

Figure 2:
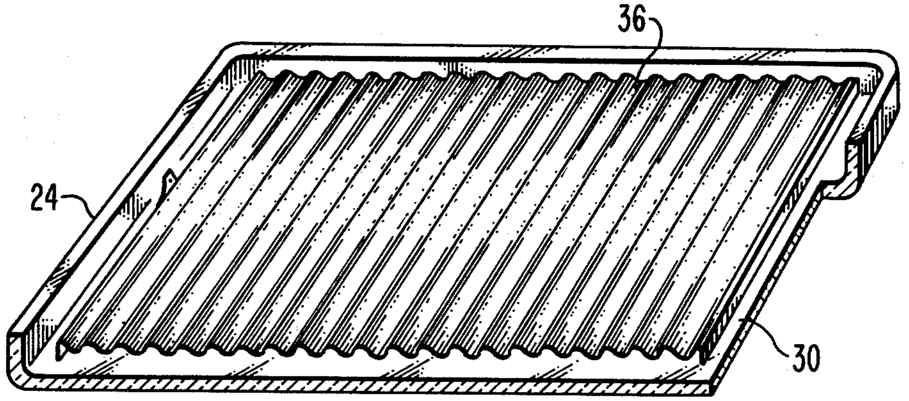
Fig. 2. PRIOR ART
FIG. 2 is a perspective view of the mask-faceplate assembly of the tube of FIG. 1.

The apertured mask 36 further depicted in FIG. 2, is corrugated in an undulatory manner, e.g. sinusoidally, along the horizontal or major axis (in the direction of the longer dimension of the mask) with the corrguations extending vertically in the direction of the minor axis (between long sides of the mask or in the direction of the shorter dimension of the mask). It should be understood that the term corrugated is herein defined broadly to include various undulatory shapes including a sawtooth, sinusoidal, and other curved shapes. Although the mask 36 is shown without any curvature along its major and minor axes, a mask having the same or different curvatures along these axes also is included within the scope of the present invention. Similarly, while the faceplate panel is shown as flat, it too may be curved along both major and minor axes.

The mask 36 includes a plurality of slit-shaped apertures aligned in vertical columns. In order to keep an acceptable line pattern on the screen, that is to maintain the desired brightness level and the spacing or nesting between the phosphor lines, aperture width and the horizontal spacing between aperture columns is generally varied as a function of the spacing between the mask 36 and the screen 30. The peak-to-peak wavelength dimension of the corrugated variation in the mask should be at least twice as great as the spacing between adjacent aperture columns.

Figure 3:
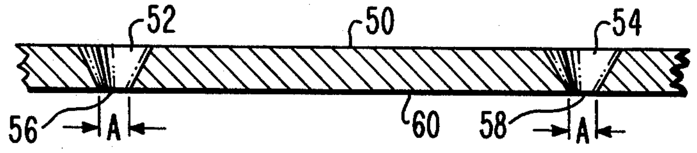
FIG. 3 is a cross-sectional view of a portion of a simplified unformed shadow mask not incorporating an embodiment of the present invention.
Figure 4:
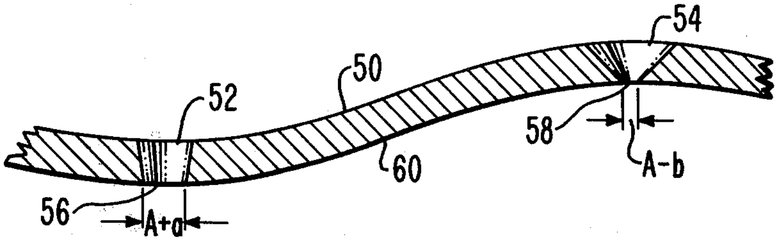
FIG. 4 is a cross-sectional view of the mask of FIG. 3 after it has been formed.

In order to illustrate the problem solved by the present invention, a portion of an apertured but unformed shadow mask 50 not including an embodiment of the present invention, is shown in FIG. 3 and the same portion of the same mask is shown after forming in FIG. 4. The unformed mask 50 of FIG. 3 has two apertures 52 and 54 both of which have throats 56 and 58, respectively, of equal width A. The throats 56 and 58 are on a side 60 of the mask 50 that will eventually face the electron guns in a completed tube. During formation, the mask side 50 in the vicinity of the first aperture 52 is bent convexly and in the vicinity of second aperture 54 is bent concavely. The convex bending causes a stretching of the throat 56 of the aperture 52 so that the aperture width at the throat 56 is enlarged to A+a. Conversely, the concave bending causes a compression of the throat 58 of the aperture 54 so that the aperture width at the throat 58 is reduced to A−b.

Figure 5:
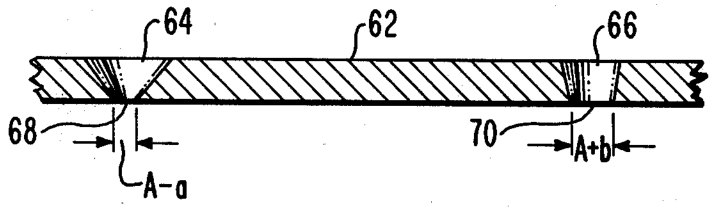
FIG. 5 is a cross-sectional view of a portion of a simplified unformed shadow mask incorporating an embodiment of the present invention.
Figure 6:
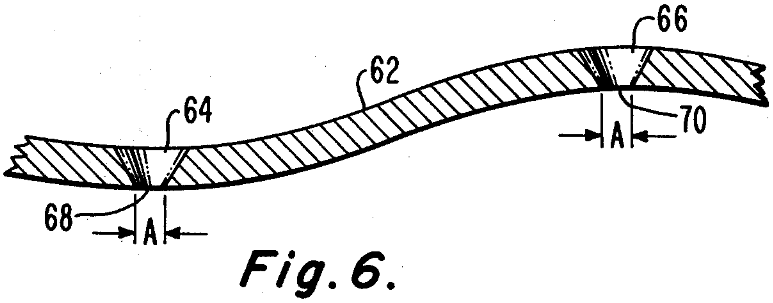
FIG. 6 is a cross-sectional view of the mask of FIG. 5 after it has been formed.

In the present invention, aperture width in the unformed mask is adjusted to account for this stretching and compression occurring during formation of a mask into a corrugated shape. FIG. 5 shows a portion of an apertured but unformed mask 62 having apertures 64 and 66 wherein the size of the apertures have been adjusted. In the unformed mask 62, the aperture 64 has a throat 68 which is reduced to A−a and the aperture 66 has a throat 70 which is increased to A+b. Thereafter, when the mask 62 is formed into its corrugated shape, as shown in FIG. 6, stretching of the aperture 64 enlarges its throat 68 to the desired width A and compression of the aperture 66 reduces its throat also to A. Therefore, the resultant mask is substantially free of aperture width variation from that desired caused by forming the mask.

It should be understood that in a corrugated mask, aperture width is varied with mask-to-screen spacing and for various other reasons which are not the subject of the present invention. For reasons of simplification, these other factors which affect aperture width have been omitted from the foregoing preferred embodiment.

We claim:

1. In a method of constructing a corrugated mask for use in a color picture tube, wherein the mask is first apertured and thereafter formed into a corrugated shape, the improvement comprising, in an unformed mask, forming the apertures in first locations with greater widths than the desired widths at the first locations and forming the apertures in second locations with lesser widths than the desired widths at the second locations, and forming said mask into a corrugated shape such that the apertures in said first locations are compressed in width to the desired widths and the apertures in said second locations are stretched to the desired widths.

2. In a method of constructing a corrugated mask for use in a color picture tube wherein the mask is first apertured and thereafter formed into a corrugated shaped, the improvement comprising, in an unformed mask, increasing the width of apertures in at least some locations that will be compressed and decreasing the width of apertures in at least some locations that will be stretched during formation of the mask into a corrugated shape, and forming said mask into a corrugated shape such that the apertures of increased width are compressed in width and the apertures of decreased width are stretched in width.

3. A corrugated mask for use in a color picture tube constructed by the method of claim 2.

4. In a method of constructing an apertured mask type color picture tube having a faceplate, a cathodoluminescent screen on the faceplate, a corrugated apertured mask adjacent the screen and electron gun means for producing a plurality of electron beams and directing said beams through said mask to impinge upon said screen wherein the mask corrugations are substantially parallel and extend in a first direction with the corrugated waveform extending in a second direction said mask including an aperture width variation in the second direction which is function of mask-to-screen spacing variations, and wherein said mask is constructed by first forming the apertures therein and thereafter forming said mask in a corrugated shape, the improvement comprising, in an unformed mask, forming the apertures in first locations with greater widths than the desired widths at the first locations and forming the apertures in second locations with lesser widths than the desired widths at the second locations, and forming said mask into a corrugated shape such that the apertures in said first locations are compressed in width to the desired widths and the apertures in said second locations are streched to the desired widths.

5. A color picture tube constructed by the method of claim 4.

6. In a method of constructing a color picture tube having a corrugated apertured mask wherein each of the mask apertures has a larger surface opening on one side than on the opposite side, the surface openings on the opposite side constituting the throat of each aperture, the improvement comprising, in an unformed mask, forming the throats in first locations with greater widths than the desired widths at the first locations and forming the throats in second locations with lesser widths than the desired widths at the second locations, and forming said mask into a corrugated shape such that the throats in said first locations are compressed in width to the desired widths and the throats in said second locations are stretched to the desired widths.

* * * * *